United States Patent
Han et al.

(10) Patent No.: US 12,257,607 B2
(45) Date of Patent: Mar. 25, 2025

(54) SYSTEM AND METHOD FOR SALT REMOVAL FROM SOLID MEDIA

(71) Applicant: Chevron U.S.A. Inc., San Ramon, CA (US)

(72) Inventors: Joonkyoung Han, Katy, TX (US); John B. Trenery, Jr., Sugar Land, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/481,180

(22) Filed: Oct. 4, 2023

(65) Prior Publication Data

US 2024/0109105 A1 Apr. 4, 2024

Related U.S. Application Data

(60) Provisional application No. 63/384,148, filed on Nov. 17, 2022, provisional application No. 63/378,332, filed on Oct. 4, 2022.

(51) Int. Cl.
| | |
|---|---|
| *B08B 3/04* | (2006.01) |
| *B08B 13/00* | (2006.01) |
| *E21B 21/06* | (2006.01) |
| *C02F 103/36* | (2006.01) |
| *E21B 43/34* | (2006.01) |

(52) U.S. Cl.
CPC ............. *B08B 3/042* (2013.01); *B08B 13/00* (2013.01); *E21B 21/065* (2013.01); *C02F 2103/365* (2013.01); *E21B 21/063* (2013.01); *E21B 43/34* (2013.01)

(58) Field of Classification Search
CPC ..... B08B 3/042; B08B 13/00; E21B 21/0065; E21B 21/063; E21B 43/34; C02F 2103/365
See application file for complete search history.

(56) References Cited

U.S. PATENT DOCUMENTS

| | | | |
|---|---|---|---|
| 2008/0156709 A1* | 7/2008 | Johnson | B01D 65/00 210/106 |
| 2014/0299529 A1* | 10/2014 | Govind | C02F 1/4693 210/243 |
| 2016/0137532 A1* | 5/2016 | Slough | C02F 1/42 210/189 |
| 2023/0191290 A1* | 6/2023 | Marco | B01D 29/114 210/768 |

* cited by examiner

*Primary Examiner* — Sharidan Carrillo
(74) *Attorney, Agent, or Firm* — Jason M. Guerrero

(57) ABSTRACT

A process for reducing the salinity of salt containing material (SCM) includes introducing the SCM into a wash system configured to sequentially wash the SCM with water having decreasing salinity levels across a plurality of mixing tanks arranged in series; introducing feed water into the wash system in a countercurrent flow relative to the SCM; discharging washed SCM from the wash system, the washed SCM having a lower salinity compared to the SCM that is initially introduced into the wash system; and discharging brine from the wash system, the brine being generated in a mixing tank that initially receives the SCM into the wash system.

9 Claims, 5 Drawing Sheets

SYSTEM AND METHOD FOR SALT REMOVAL FROM SOLID MEDIA

CROSS-REFERENCE TO RELATED APPLICATIONS

This application claims priority to and the benefit of U.S. Provisional Patent Application No. 63/378,332, filed Oct. 4, 2022, entitled "SYSTEM AND METHOD FOR SALT REMOVAL FROM SOLID MEDIA" and U.S. Provisional Patent Application No. 63/384,148, filed Nov. 17, 2022, entitled "SYSTEM AND METHOD FOR SALT REMOVAL FROM SOLID MEDIA," both of which are herein incorporated by reference in their entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Drilling activities generate drill cuttings that may have relatively high salinity. Such drill cuttings are typically disposed of in reserve pits. Once the drilling activity is completed, the drill cuttings are either excavated from the reserve pit and sent off for disposal or treatment, blended with low salinity soil, flushed with water, or capped with impermeable liners. Where permitted by regulations, the drill cuttings may be simply buried in-place. For brine impacted soil, there are many methods used to remove the salts. Many of these methods target to enhance the drainability of the soil, extract and convert salt into a more manageable form, and/or limit the mobility of salts.

Although these pre-existing solutions have been widely used for the past several decades, they all have critical limitations; they either rely solely on dilution or immobilization rather than removing the salts from media, require large quantity of fresh water, require complicated equipment and processes, or are expensive for large scale applications.

Therefore, there is a need for a solution that can remove salts from media using minimum resources (e.g., water), with simple devices, and operate at a relatively low cost to effectively manage salt issues associated with drill cuttings and brine impacted soil.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One aspect of the disclosure provides a method of reducing salinity of salt-containing material (SCM) generated during production of hydrocarbons from a reservoir. The method includes introducing the SCM into a wash system having at least one mixing tank and introducing feed water into the wash system in a countercurrent flow relative to the SCM. The method also includes mixing the SCM and the feed water in the at least one mixing tank to produce brine and a washed SCM; discharging washed SCM from the wash system, the washed SCM having a lower salinity compared to the SCM that is initially introduced into the wash system; and discharging brine from the wash system, the brine being generated from the feed water and having a higher salinity compared to the feed water.

Another aspect of the disclosure provides a system for reducing salinity of salt-containing material (SCM) generated during production of hydrocarbons from a reservoir. The system includes a wash system configured to receive the SCM (e.g., from a solids control system of a hydrocarbon production system), and configured to wash the SCM with a feed water received from a feed water source. The system also includes one or more mixing tanks of the wash system having a washed SCM outlet and a brine outlet. The washed SCM outlet is configured to discharge washed SCM having a lower salinity compared to the SCM introduced into the wash system. The brine outlet is configured to discharge brine having a higher salinity compared to the feed water introduced into the wash system.

BRIEF DESCRIPTION OF THE DRAWINGS

These and other objects, features and advantages of the present disclosure will become better understood with reference to the following description, appended claims and accompanying drawings, wherein:

DESCRIPTION OF THE INVENTION

As set forth above, drill cuttings and brine impacted soil may contain a significant amount of salt which can impact ground water and vegetation growth if left in subsurface locations at high concentrations without proper treatment or containment. It is now recognized that there is a need for a solution that can remove salts from media using minimum resources (e.g., water), with simple devices, and operate at a relatively low cost to effectively manage salt issues associated with drill cuttings and brine impacted soil. These and other technical problems are addressed by the embodiments of this disclosure, which relate to the use of one or more vessels (e.g., mixing tanks) filled with water to extract salts from salt-containing media (SCM) (e.g., drill cuttings or brine impacted soil). For example, embodiments of the invention may utilize a series of mixing tanks (e.g., two or more tanks, such as between 2 and 10 tanks) filled with water to extract salts out from SCM. Other embodiments of the invention may utilize one or more vessels to mix water with SCM in a manner that extracts salts out from the SCM.

In general, present embodiments include washing SCM with water before discharging the media into a disposal location (e.g., reserve pit). The washing process may involve the use of multiple mixing tanks in series, where water and the SCM enter and exit the system in opposing locations and flow counter to one another. An example system 10 for salt removal from SCM (e.g., drill cuttings) is depicted in FIG. 1.

Figure 1:
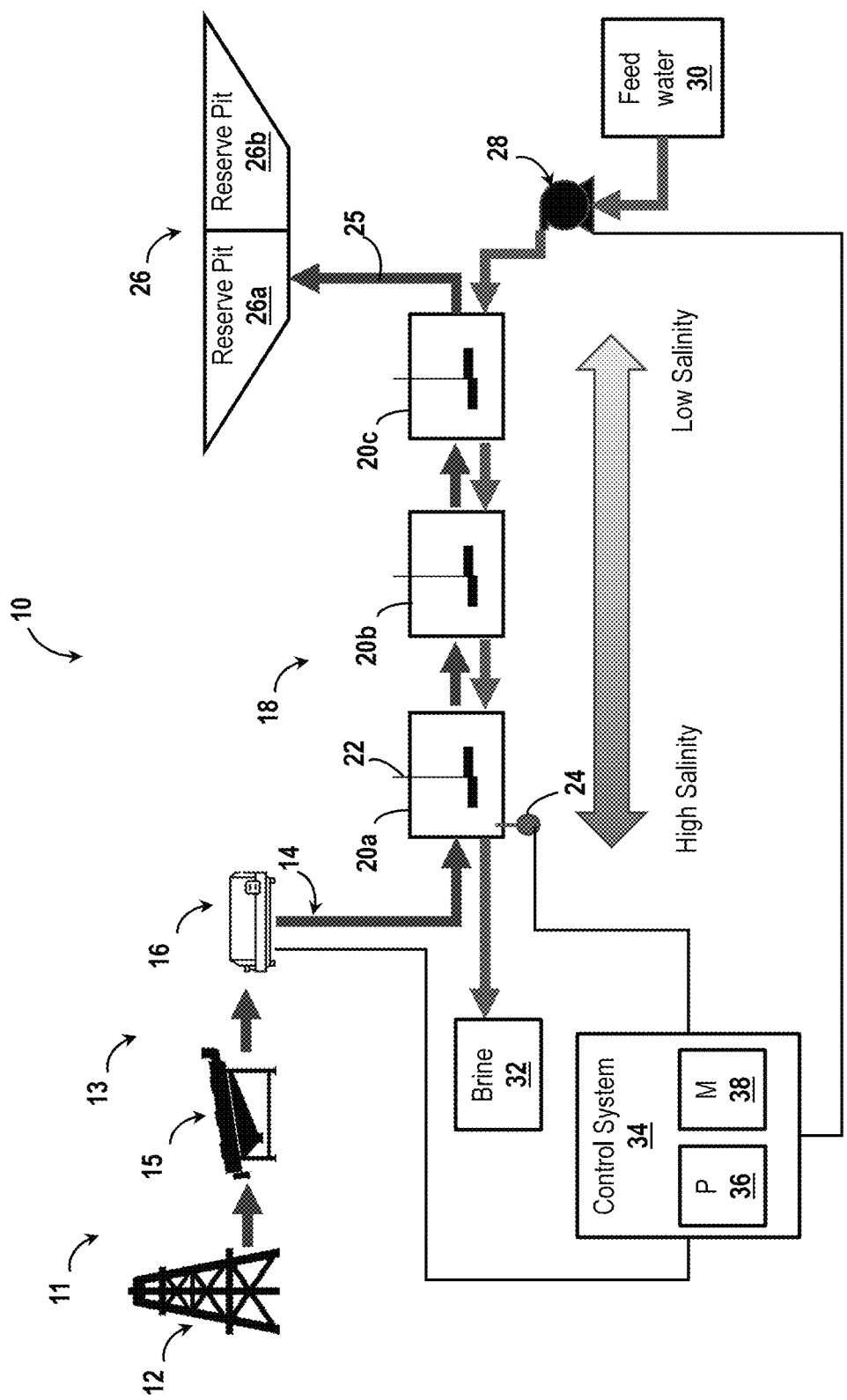
FIG. 1 illustrates a system for removing salt from drill cuttings, in accordance with an embodiment of this disclosure.

In the illustrated embodiment of FIG. 1, the system 10 includes a hydrocarbon production system 11 including a drilling system 12 that produces SCM, in particular drill cuttings 14, during operation. While some of the remaining discussion references drill cuttings 14 as SCM, it should be noted that the features and operations described herein may be applicable to other salt-containing media as well, such as brine-impacted soil. The system 10 may, in some embodiments, include a media conveyance system including, for example, an auger or other conveyor positioned downstream of the drilling system 12. In the illustrated embodiment, the system 10 includes a shale shaker 15 and centrifuge 16 configured to receive drilling material from the drilling system 12 and provide the drill cuttings 14 to a wash system 18. In other embodiments, the wash system 18 may receive SCM (drill cuttings 14) directly from the drilling system 12 (e.g., with no shale shaker 15 and/or centrifuge 16). The wash system 18 is configured to wash the drill cuttings 14 to reduce their salinity. In embodiments where the system 10 is configured to treat brine-impacted soil, certain elements such as the drilling system 12, shale shaker 15, and the centrifuge 16 may not be present and instead a media conveyance system may simply supply soil to the wash system 18.

The wash system 18 includes a plurality of mixing tanks 20—depicted in this embodiment as including a first mixing tank 20a, a second mixing tank 20b downstream of the first mixing tank 20a, and a third mixing tank 20c downstream of the second mixing tank 20b. Here, "upstream" and "downstream" are relative to the movement of drill cuttings 14 (SCM) through the system 10. While the mixing tanks 20 are shown as being in series, in some embodiments, at least some of the mixing tanks 20 may be placed and/or operated in parallel. The wash system 18 also includes at least one mixing device (e.g., agitator 22) configured to mix (e.g., agitate) the SCM (drill cuttings 14) with water. In the illustrated embodiment of FIG. 1, the wash system 18 includes at least one agitator 22 for each of the mixing tanks 20.

The system 10 may also include one or more sensors 24 configured to monitor parameters of the washing process conducted by the wash system 18. The one or more sensors 24 may include level sensors configured to monitor the level of fluid in the mixing tanks 20, salinity testers, conductivity sensors that allow determination of salinity, or any combination thereof. In one embodiment, the system 10 may include a level sensor in each of the mixing tanks 20 but only one sensor for determining the salinity in the first tank 20a, which as arranged is configured to have the highest salinity discharge as discussed in further detail below. In other embodiments, each of the mixing tanks 20 may have a corresponding sensor 24 for determining salinity (also referred to as a "salinity sensor" herein).

Each of the mixing tanks 20 may also be equipped with appropriate equipment for selective discharge of solids and liquids. By way of example, each of the mixing tanks 20 may include an inlet, an outlet, valves, conduits, and so forth that allow water (e.g., feed water, saline water) to be introduced into and discharged out of the mixing tanks 20. Each of the mixing tanks 20 may also include features such as an inlet, an outlet, augers, strainers, and so forth to convey the drill cuttings 14 (or other SCM) through the wash system 18—eventually as washed SCM 25 (e.g., washed drill cuttings having a lower salinity compared to the drill cuttings initially introduced into the wash system 18) into a discharge location such as a reserve pit 26. The reserve pit 26 may include, by way of non-limiting example, a fresh water compartment 26a and a brine compartment 26b. The washed SCM 25 generated by the wash system 18 may, in some embodiments, be provided to the fresh water compartment 26a while brine (saline water) generated by the wash system 18 may be, in some embodiments, stored in the brine compartment 26b.

Figure 2:
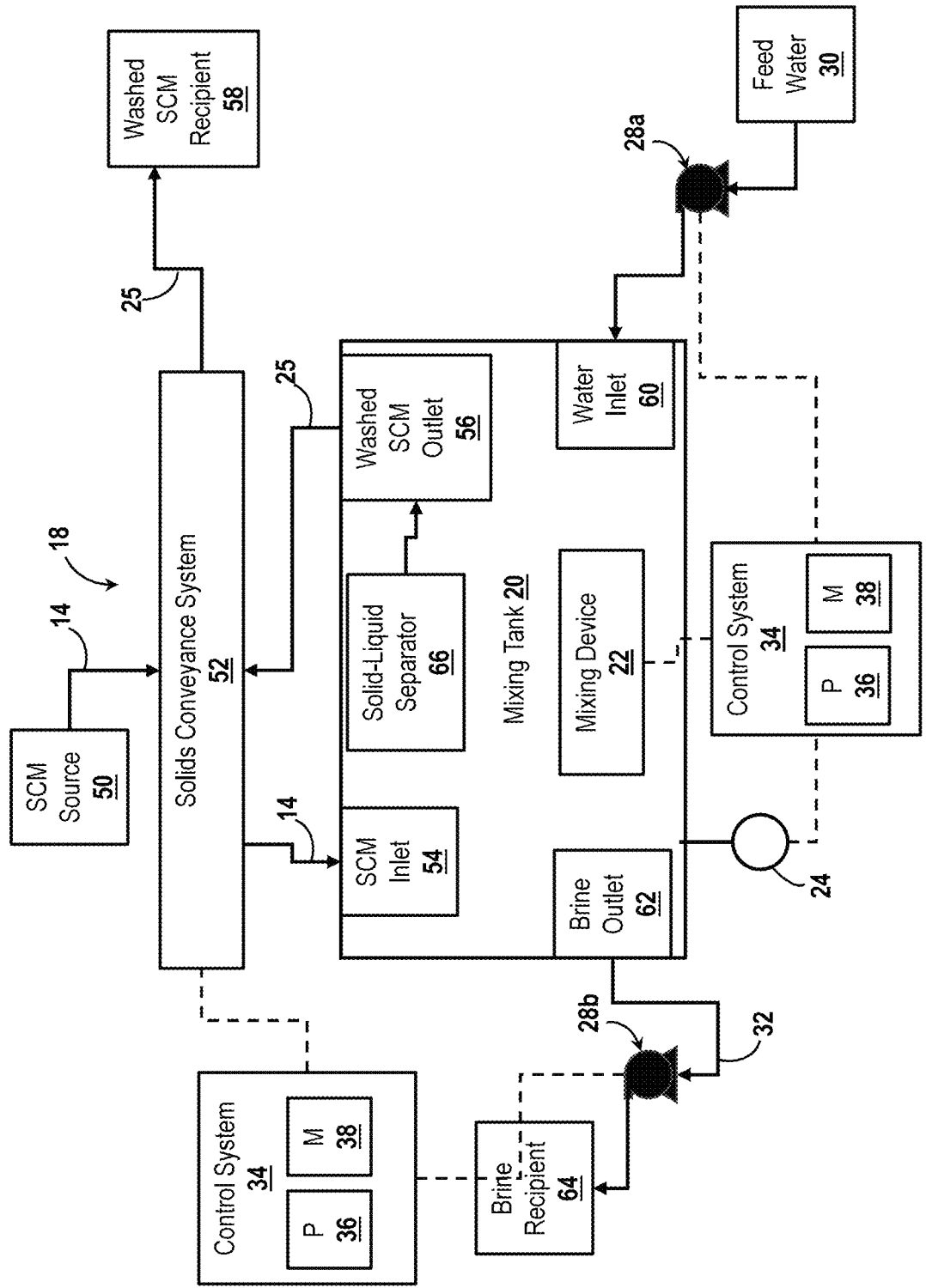
FIG. 2 is a block diagram of an example of a mixing tank and associated control system configured in accordance with an embodiment of this disclosure.

As described in more detail with respect to FIG. 2, in some embodiments, each of the mixing tanks 20 may be equipped with a solid/liquid separating system to separate out the solids and a solid conveying device to send solids to a downstream tank. The solid/liquid separating system and conveyance system may have various forms and can include integrated equipment that has both functions (e.g., equipment that performs both separation and transport). A liquid transfer device, such as a pump, may be positioned in between the mixing tanks 20 to transport the liquid to the upstream mixing tank.

As shown in FIG. 1 one or more pumps 28 or other liquid conveyance devices may be utilized to motivate water (fresh and/or saline) through the wash system 18. For example, the one or more pumps 28 may be placed upstream or downstream of any one or a combination of the mixing tanks 20. In the illustrated embodiment, the system 10 includes a pump 28 that introduces feed water 30 (e.g., fresh water) into the third mixing tank 20c. Other pumps may be used to move the water out of the third mixing tank 20c and into the second mixing tank 20b. After the water has been motivated through the wash system 18, the one or more pumps 28 may finally motivate the resulting brine water 32 out of the first tank 20a for further use or disposal. As may be appreciated with reference to the movement of water through the wash system 18, the feed water 30 thus flows in an opposite direction relative to the SCM, i.e., in a countercurrent flow. By way of non-limiting example, the feed water 30 may be sourced from the fresh water compartment 26a of the reserve pit 26 or another fresh water source.

The system 10 may also include a control system 34 having one or more processors 36 and one or more memory devices 38 configured to monitor parameters of the system 10 and control the operation of the system 10 to produce the brine 32 and reduced salinity drill cuttings. The control system 34 may include a distributed control system or any other control system configuration and is described in further detail below. In particular, the one or more processors 36 may execute machine-readable instructions to perform various monitoring and control functions. The one or more memory devices 38 store machine-readable information such as executable code, data, and so forth, relating to the system 10 and the operation thereof. The control system 34 may also include associated interface devices (not shown) such as a display and user input devices (e.g., a keyboard, keypad, mouse, touchscreen) to allow interaction and to provide alerts to an operator where appropriate.

The control system 34, as noted, may control many aspects of the operation of the system 10 including feed rates of the drill cuttings 14 and the feed water 30, mixing rates, rates of material transfer between the mixing tanks 20, residence time of the water and drill cuttings within each mixing tank 20, and so forth. As an example process, the SCM is conveyed into the first mixing tank 20a in the series, where it is submerged and washed with water. The washed SCM is then conveyed to subsequent tanks in a sequential manner, where it is washed with water repeatedly as it moves to each tank. Feed water 30, in contrast, is supplied into the last tank in the series (the third mixing tank 20c, in the illustrated embodiment) and conveyed in the opposite direction of the SCM toward the first mixing tank 20a. By generating such counter-flow, the SCM will always be washed (e.g., mixed) with the lowest salinity water before leaving the wash system 18 resulting in low salt content, whereas the water will carry the extracted salts towards the first mixing tank 20a in the series.

The water in the first mixing tank 20a may be controlled by the control system 34 such that it will not exit the system 18 until it reaches a target salinity. Thus, only a stream of high salinity water, which the salinity can be adjusted as desired, will be generated during such a process. Depending on the situation, the generated high salinity water may be reused directly or after treatment for other purposes such as drilling.

In some of the systems described herein, for all mixing tanks 20 except for the first and last, the SCM will be conveyed from the previous tank in the series while water is conveyed from the subsequent tank. After sufficient mixing of SCM and water in the tanks 20, the SCM will be transferred to the next tank while water is pumped to the previous tank in the series. For the first mixing tank 20a, SCM may be supplied from the hydrocarbon production system 11 and exiting water (e.g., the high salinity brine 32) may be sent to a location for storage or further use. By way of non-limiting example, as noted above, the brine 32 may be stored in the brine compartment 26b of the reserve pit 26. In other embodiments, the brine 32 may be stored in a storage vessel (e.g., frac tanks). For the last tank in the series (the third mixing tank 20c in FIG. 1), the SCM may be conveyed to a staging area, temporary storage vessel, or final disposal location (e.g., the freshwater compartment 26a of the reserve pit 26), while the feed water 30 may be fed from a feeding system (e.g., fresh water compartment 26a, a water tank, tap).

The control system 34 may utilize readings from conductivity sensors to measure the salt concentration of water, and may utilize readings from level sensors to detect the water level in the mixing tanks 20. The conductivity sensors will be used in the first mixing tank 20a in the series to determine when the high salinity brine 32 would be discharged. The control system 34 may further utilize readings from conductivity sensors installed in the last tank in the series to initiate feed water inflow when the salinity in the last mixing tank (third mixing tank 20c in FIG. 1) exceeds a set value. The control system 34 may use readings from level sensors installed in all the mixing tanks 20 and will either initiate in-flow of water when the water level drops below a set point or start discharging of water if water level exceeds a set point.

Present embodiments address a number of technical issues. For example, using the disclosed system and process, salts can be removed from SCM and transferred to a high salinity brine. This may significantly reduce potential environmental impacts that may be attributable to salt contents of SCM when disposed in the subsurface. Since salts are concentrated into highly saline brine the volume of wastewater generated from the process and the water required for the salt extraction could be minimized.

Embodiments of this invention may be used on all onshore drilling sites where the drill cuttings and drilling fluid contains high level of salts. The disclosed system and method removes salts from drill cuttings before it is discharged into reserve pits or containers, and can also be used to clean drill cuttings that have already been discharged, or reserve pits that have been closed. Present embodiments can potentially reduce the cost of pit closure, pit draining, fresh water purchase, and brine purchase for drilling.

As previously noted, the disclosed system and method may be used to remediate brine impacted soil, and is particularly effective for sites where the salt concentrations in soil are high. For low salt level soils, adding a desalination process to further concentrate the generated brine may maximize the benefit.

In reference to the control system 34 of FIG. 1, in some implementations, some or all of the functionalities attributed herein to the control system 34 may be provided by external resources not illustrated as being in the system 10. External resources may include hosts/sources of information, computing, and/or processing and/or other providers of information, computing, and/or processing outside of the system 10.

Any communication medium may be used to facilitate interaction between any components of the system 10 and the control system 34. One or more components of the system 10 may communicate with each other and/or the control system 34 through hard-wired communication, wireless communication, or both. For example, one or more components of the system 10 may communicate with each other through a network. For example, the processor 36 may wirelessly communicate with the memory 38. By way of non-limiting example, wireless communication may include one or more of radio communication, Bluetooth communication, Wi-Fi communication, cellular communication, infrared communication, or other wireless communication. Other types of communications are contemplated by the present disclosure.

Although the control system 34, the processor 36, and the memory 38 are shown in FIG. 1 as single entities, this is for illustrative purposes only. One or more of the components of the control system 34 may be contained within a single device or across multiple devices. For instance, the processor 36 may comprise a plurality of processing units. These processing units may be physically located within the same device, or the processor 36 may represent processing functionality of a plurality of devices operating in coordination. The processor 36 may be separate from and/or be part of one or more components of the system 10. The processor 36 may be configured to execute one or more functions by software; hardware; firmware; some combination of software, hardware, and/or firmware; and/or other mechanisms for configuring processing capabilities on the processor 36. The control system 34 may be implemented in a single computing device, across multiple computing devices, in a client-server environment, in a cloud environment, and/or in other devices/configuration of devices. The control system 34 may be implemented using a computer, a desktop, a laptop, a phone, a tablet, a mobile device, a server, and/or other computing devices.

While certain processes are described herein as being implemented via processor 36 through machine-readable instructions, this is merely for ease of reference and is not meant to be limiting. In some implementations, one or more functions of computer program components described herein may be implemented via hardware (e.g., dedicated chip, field-programmable gate array) rather than software. One or more functions of components of the system 10 described herein may be software-implemented, hardware-implemented, or software and hardware-implemented.

The description of the functionality provided by the control system 34 herein is for illustrative purposes, and is not intended to be limiting. For example, one or more functionalities, interfaces, and so forth, may be eliminated, and some or all of its functionality may be provided by other computer program components.

The electronic storage media of the memory 38 may be provided integrally (i.e., substantially non-removable) with one or more components of the control system 34 and/or as removable storage that is connectable to one or more components of the control system 34 via, for example, a port (e.g., a USB port, a Firewire port, etc.) or a drive (e.g., a disk drive, etc.). The memory 38 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The memory 38 may be a separate component within the system 10, or the memory 38 may be provided integrally with one or more other components of the system 10 (e.g., the processor 36). Although the memory 38 is shown in FIG. 1 as a single entity, this is for illustrative purposes only. In some implementations, the memory 38 may comprise a plurality of storage units. These storage units may be physically located within the same device, or the memory 38 may represent storage functionality of a plurality of devices operating in coordination.

FIG. 2 depicts an example of a more particular arrangement of features associated with the mixing tank 20 that allows for the mixing and countercurrent flow between the SCM and the feed water 30. Generally, the mixing tank 20, which may be representative of one or more of the mixing tanks 20 of FIGS. 1 and 3-5, is configured to receive SCM (e.g., cuttings 14) from an SCM source 50, such as the hydrocarbon production system 11. A solids conveyance system 52, for example, may transport the SCM from the hydrocarbon production system 11 and into the mixing tank 20 via an SCM inlet 54 of the mixing tank 20. The solids conveyance system 52 may include, by way of example, one or more devices configured to transport solids into, out of, and between mixing tanks 20 (i.e., into, through, and out of the wash system 18). The one or more devices may include one or more conveyor belts, augers, hoppers, troughs, or the like. In one embodiment, the SCM may be fluidized using one or more fluids to facilitate transfer. For instance, a relatively small amount of water (e.g., relative to what is mixed with the SCM in the mixing tank 20) may be added to the solids to move the solids in a more fluidized manner compared to dry solids.

The control system 34 as illustrated is communicatively coupled to the solids conveyance system 52. In some embodiments, the control system 34 may be configured to control operation of the solids conveyance system 52 in response to various inputs. In some embodiments, for instance, the control system 34 may be configured receive a signal indicative of the salinity level of liquids within the mixing tank 20 from the sensor 24 and may control operation of the solids conveyance system 52 in response to at least this input. In this way, the solids conveyance system 52 may operate (e.g., in response to control signals from the control system 34) to introduce SCM into the mixing tank 20 via the SCM inlet 54 and may operate to move washed SCM 25 out of the mixing tank 20 via a washed SCM outlet 56. The washed SCM may be provided to a washed SCM recipient 58, which may be another mixing tank 20 (e.g., for further washing of the SCM) or the reserve pit 26 noted with respect to FIG. 1.

With respect to the flow of water through the mixing tank 20, as illustrated in the example of FIG. 2, the mixing tank 20 includes a water inlet 60 and a brine outlet 62 which allow for the inflow of feedwater 30 and the outflow of brine 32, respectively. The control system 34 may control flow of the feedwater 30 into the mixing tank 20 by sending control signals to one or more flow control devices such as the pump 28a, which has its outlet fluidly connected to the water inlet 60. Similarly, the control system 34 may control flow of the brine 32 out of the mixing tank 20 by sending control signals to one or more flow control devices such as the pump 28b, which has its inlet fluidly coupled to the brine outlet 62 and its outlet fluidly connected to a brine recipient 64. Thus, the pump 28b may be used to provide the brine 32 to, for instance, another mixing tank 20, the hydrocarbon production system 11, the brine compartment 26b of the reserve pit 26, or another destination.

In some embodiments, for instance, the control system 34 may be configured receive one or more signals indicative of the water level and/or salinity level of liquids within the mixing tank 20 from the one or more sensors 24 and may control operation of the pump 28a (configured to pump the feed water 30 into the mixing tank 20) and/or the pump 28b (configured to pump the brine 32 out of the mixing tank 20) in response to at least this input.

As shown in the example, the water inlet 60 and the SCM inlet 54 are on opposing sides of the mixing tank 20 and the washed SCM outlet 56 and the brine outlet 62 are on opposing sides of the mixing tank 20. These relative positions may encourage countercurrent flow of water and SCM within the mixing tank 20, although this relative positioning is not necessarily required. Such positioning may also encourage turbulence within the mixing tank 20, which may facilitate mixing.

To further encourage mixing, the mixing tank 20 may also include the mixing device 22 as described above. The control system 34 in some embodiments may control the mixing device 22 based on any one or a combination of factors including inputs received from the one or more sensors 24. The mixing device 22, as noted, may be an agitator such as an impeller device, a sonication device, etc.

A solid-liquid separator 66, which may be a part of the solids conveyance system 52 or separate from the solids conveyance system 52, is configured to separate the washed SCM 25 from water in the mixing tank 20. The solid-liquid separator 66 may include, by way of non-limiting example, a filter, a strainer, a centrifuge, a hydrocyclone, a belt press, a membrane plate and frame, a screw press, or the like. The solid-liquid separator 66 may be moved into and out of the mixing tank 20 or may be installed in the mixing tank 20 in a fixed manner.

Figure 3:
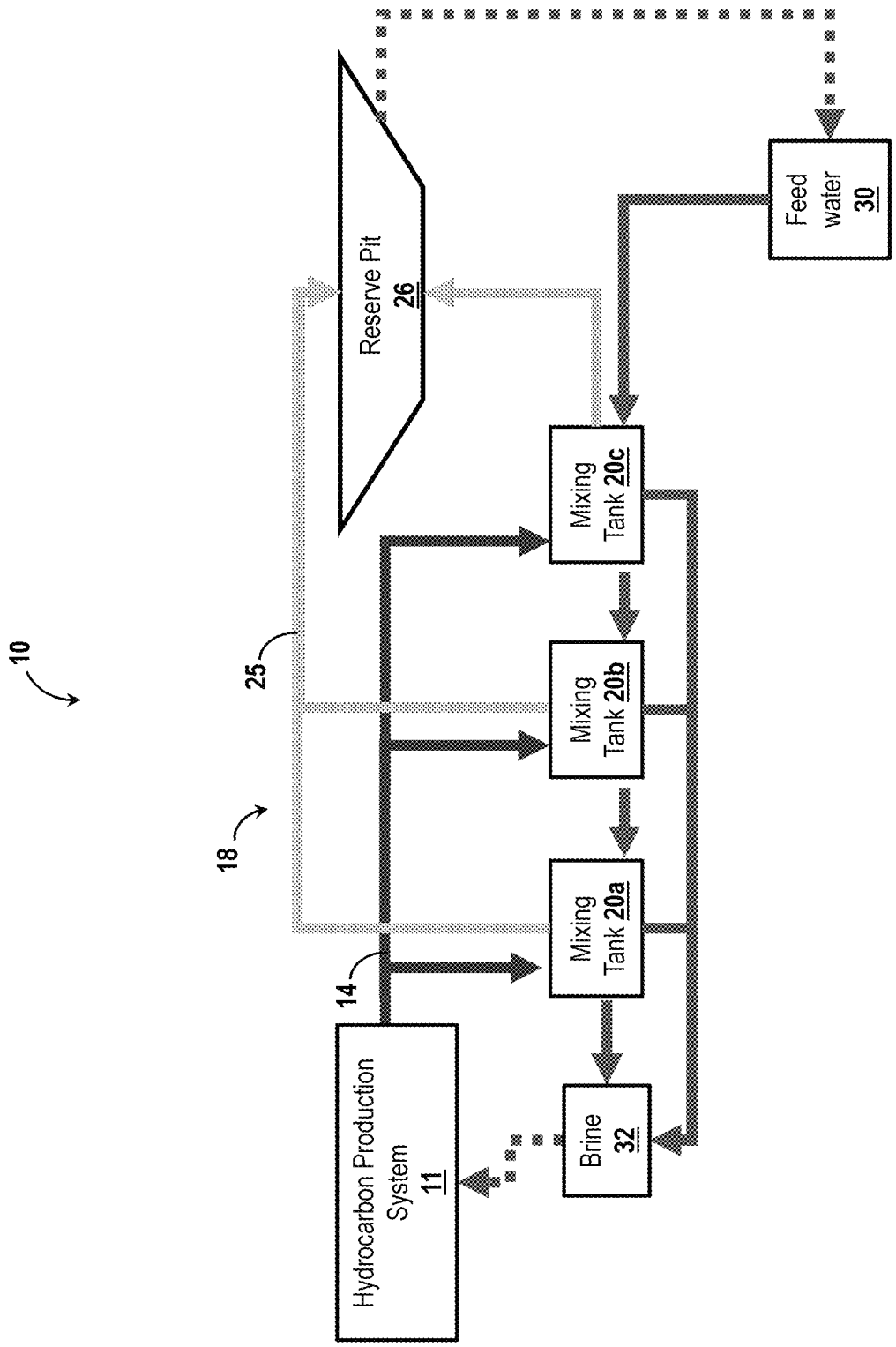
FIG. 3 illustrates a system that uses a batch method for removing salt from drill cuttings, in accordance with an embodiment of this disclosure.
Figure 4:
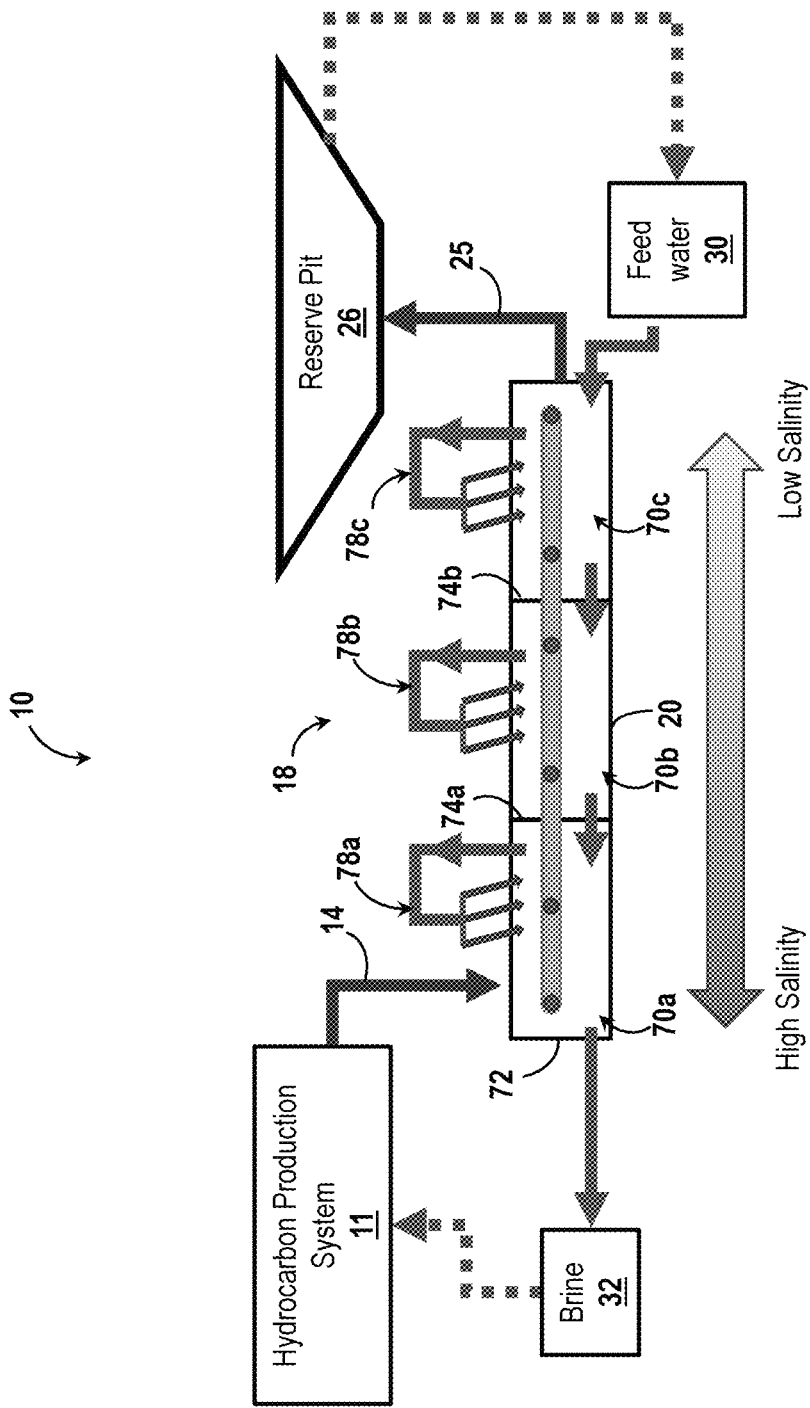
FIG. 4 illustrates a system that uses a tank with compartments for removing salt from drill cuttings, in accordance with an embodiment of this disclosure.
Figure 5:
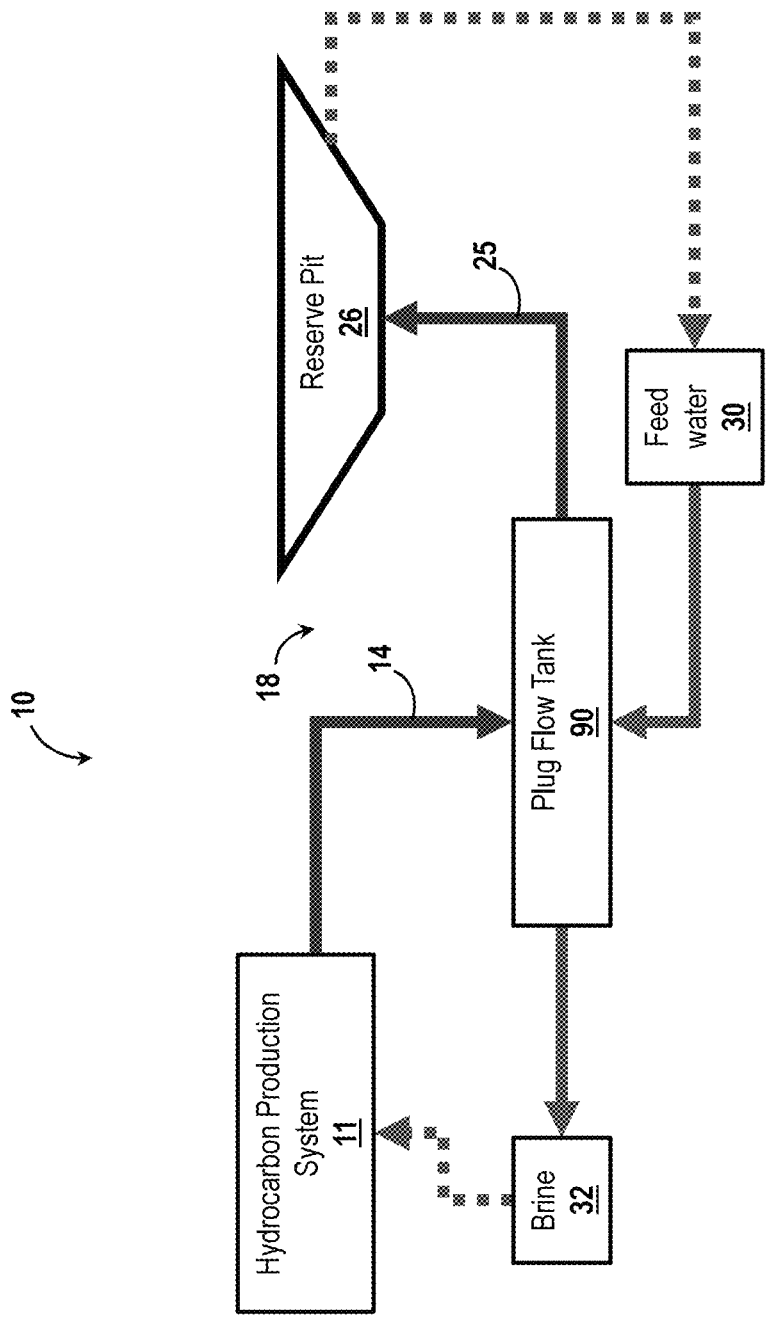
FIG. 5 illustrates a system that uses a plug flow arrangement for removing salt from drill cuttings, in accordance with an embodiment of this disclosure.

It should be noted that the embodiments set forth above may be used in any appropriate combination, and that elements of the system 10 may have alternative arrangements that fall within the scope of this disclosure. Indeed, alternative arrangements to the system 10 depicted in FIG. 1 are shown in FIGS. 3-5. Further, it should be noted that arrangements depicted in FIGS. 1-5 may be used alone, or in any appropriate combination. Particular elements, such as pumps, the control system 34, and associated features described herein with respect to FIGS. 1 and 2 are not shown in FIGS. 3-5 for clarity. However, the systems shown in FIGS. 3-5 may incorporate any or all of the features described with respect to FIGS. 1 and 2.

FIG. 3 depicts an embodiment of the system 10 capable of treating the SCM in a batchwise manner. All or a combination of this configuration may be used alone or in combination with other approaches described herein. In the embodiment of FIG. 3, only water is transferred between the mixing tanks 20, and thus the SCM (cuttings 14) do not move between the mixing tanks 20. As noted with respect to FIG. 1, the cuttings 14 are eventually disposed in the reserve pit 26 (e.g., in the fresh water compartment 26a).

In the configuration of FIG. 3, water (e.g., brine 32) discharged from one of the mixing tanks 20 is transferred to the next mixing tank 20 (e.g., from mixing tank 20c to mixing tank 20b). Alternatively, if target salinity for the brine 32 is reached, the brine 32 may be transferred from the mixing tank 20 at which the target salinity is reached to a separate brine storage such as the brine storage compartment 26b of the reserve pit 26. Thus, the brine 32 can be generated from all mixing tanks 20 and not just the first tank 20a. In some embodiments, the brine 32 may be recycled to the hydrocarbon production system 11 for further use.

In addition, each of the mixing tanks 20 will repeat the cycle of water injection—mixing with the SCM (cuttings 14)—water discharge until the salinity level of the water in the mixing tank 20 or the salinity level of the SCM (cuttings 14) drop to a certain level. Once the salinity drops to a threshold (e.g., desired) level, the mixing tank 20 is no longer processed. For instance, the control system 34, in response to receiving an indication (e.g., signal from the one or more sensors 24) that the threshold level has been reached, may halt the inflow of SCM and water into the particular mixing tank 20 from which the signal was generated. This process will continue with other remaining mixing tanks 20 only. By way of non-limiting example, flow may be closed off at the particular mixing tank 20 at which the threshold level of salinity was reached.

When flow is cut off to a particular mixing tank 20 the feed water injection will start from either an upstream or a downstream mixing tank 20, depending on which mixing tanks 20 have water and cuttings that have reached the targeted salinity level. As set forth in FIG. 2, each tank may be equipped with the mixing device 22, a water conveying device such as the pumps 28a and 28b, the solid-liquid separator 66, and a device that can convey cuttings to a final discharge point (e.g., the fresh water compartment 26a of the reserve pit 26). In some embodiments, solid/liquid separation may be done by pausing mixing to allow gravity separation, instead of using a specific device. Further, because each mixing tank 20 in the embodiment of FIG. 3 will be processed individually, each mixing tank 20 includes the one or more sensors 24 (see FIG. 2) to measure water level and salinity. As may be appreciated, in the embodiment of FIG. 3, the terms "upstream" and "downstream" will be defined relative to the movement of water not the SCM/cuttings.

FIG. 4 depicts an embodiment of the system 10 in which a single mixing tank 20 includes a plurality of compartments 70 (depicted as compartments 70a, 70b, and 70c). In this embodiment, the compartments 70 may act as separate mixing tanks 20 and may, in some embodiments, have features that allow for the movement of the feed water 30 and/or the SCM (e.g., cuttings 14) across the compartments 70. As depicted, for example, the mixing tank 20 may have a single outer housing 72 but may include partitions 74a, 74b that fully or partially isolate the compartments 70 from one another. The partitions 74a, 74b may be retractable or have a retractable portion, or may only partition a portion of the compartments 70 from one another, so as to allow for at least some fluid communication between the compartments 70.

Optionally, as illustrated, in some embodiments the mixing tank 20 may have a solids conveyance device 76 that passes through all the compartments 70 instead of multiple individual conveyance devices for each compartment 70. This may allow the SCM to be washed with water having decreasing levels of salinity as it is moved through the compartments 70, while also allowing the water in each compartment to be individually monitored and processed.

In addition and as another option, water spray devices 78 (e.g., nozzles 78a, 78b, 78c) may spray water on the cuttings 14 as they move on the conveyance device rather than or in addition to having a mixing device; water will be circulated within each compartment 70 until target salinity is reached in the first compartment 70c and water from subsequent compartments is conveyed to the upstream compartments 70b and 70a.

As shown in FIG. 5, in some embodiments a static tank (e.g., plug flow tank 90) may be used in addition to or in lieu of the mixing tanks 20 disclosed herein. In addition, while a single plug flow tank 90 is depicted in FIG. 5, in some embodiments multiple such tanks may be utilized, and they may be connected in series or in parallel in the manner shown in FIGS. 1, 3, and 4. Further, while the plug flow tank 90 does not include a mixing device, it may include all the other features shown in FIG. 2, such as inlets, outlets, sensors, and so forth.

In the embodiment shown in FIG. 5, in certain configurations the cuttings 14 are not moved. In this way, if multiple tanks are used, only water is conveyed from one tank to another.

As illustrated, the feed water 30 enters the tank 90 from its bottom and exits from the top of the tank 90, creating an upward flow (with respect to gravity). Optionally, a device (e.g., a distribution plate) may encourage equal distribution of the inflowing water throughout the bottom of the tank 90.

In situations where the effluent water salinity exceeds a threshold level, it may be provided to the brine compartment 27b or other brine storage. If the salinity is under a threshold, the brine 32 then can be either stored for next batch or disposed. If salinity drops to a predetermined level, the washing process is considered complete.

Optionally, in accordance with the embodiments described herein, certain chemicals (e.g., potassium, magnesium, calcium, aluminum, ferric salts, polyamines, coagulants) can be added to the feed water 30 to increase process efficiency by altering cuttings properties.

In the embodiment of FIG. 5, the washing process can start operation either as the tank 90 gets filled or after the tank 90 is filled with the cuttings 14. Further, devices to fluidize the cuttings 14 (e.g., jet pump, agitator) can be used to facilitate easier discharge of cuttings after process is complete. Optionally, a liquid/solid separation device may be positioned at the outlet of the tank 90.

It will be understood that various modifications may be made to the embodiments disclosed herein. Therefore, the above description should not be construed as limiting, but merely as exemplifications of example embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

The invention claimed is:

1. A method of reducing salinity of salt-containing material (SCM) generated during production of hydrocarbons from a reservoir, the method comprising:
   introducing the SCM into a wash system comprising at least one mixing tank;
   introducing feed water into the wash system in a countercurrent flow relative to the SCM;
   mixing the SCM and the feed water in the at least one mixing tank to produce brine and a washed SCM;
   discharging washed SCM from the wash system, the washed SCM having a lower salinity compared to the SCM that is initially introduced into the wash system; and
   discharging brine from the wash system, the brine being generated from the feed water and having a higher salinity compared to the feed water.

2. The method of claim 1, wherein mixing the SCM and the feed water in the at least one mixing tank to produce brine and the washed SCM comprises sequentially washing the SCM with the feed water across a plurality of mixing tanks arranged in series.

3. The method of claim 1, wherein the SCM comprises drill cuttings.

4. The method of claim 1, wherein the SCM comprises brine-impacted soil.

5. The method of claim 1, comprising receiving the SCM from a solids control system of a hydrocarbon production system before introducing the SCM into the wash system.

6. The method of claim 1, wherein the brine that is discharged from the wash system is generated in a mixing tank that initially receives the SCM into the wash system.

7. The method of claim 1, wherein the feed water is introduced into the wash system at a mixing tank that generates the washed SCM that is discharged from the wash system.

8. The method of claim 2, wherein as the SCM is moved through the wash system it is mixed with water having decreasing salinity levels across the plurality of mixing tanks.

9. The method of claim 8, wherein introducing feed water into the wash system in the countercurrent flow relative to the SCM comprises flowing the feed water across the plurality of mixing tanks.

* * * * *